Patented Mar. 11, 1930.

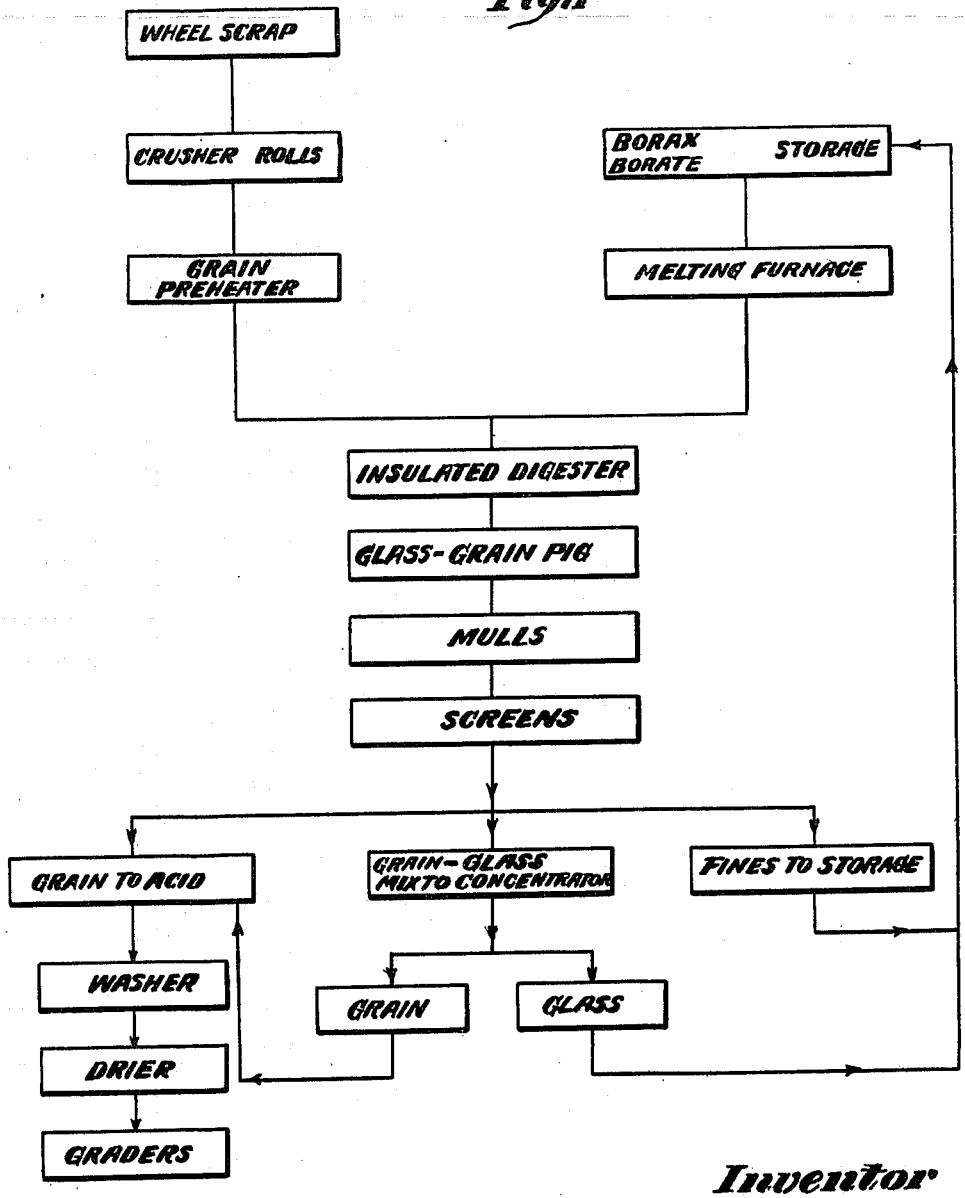

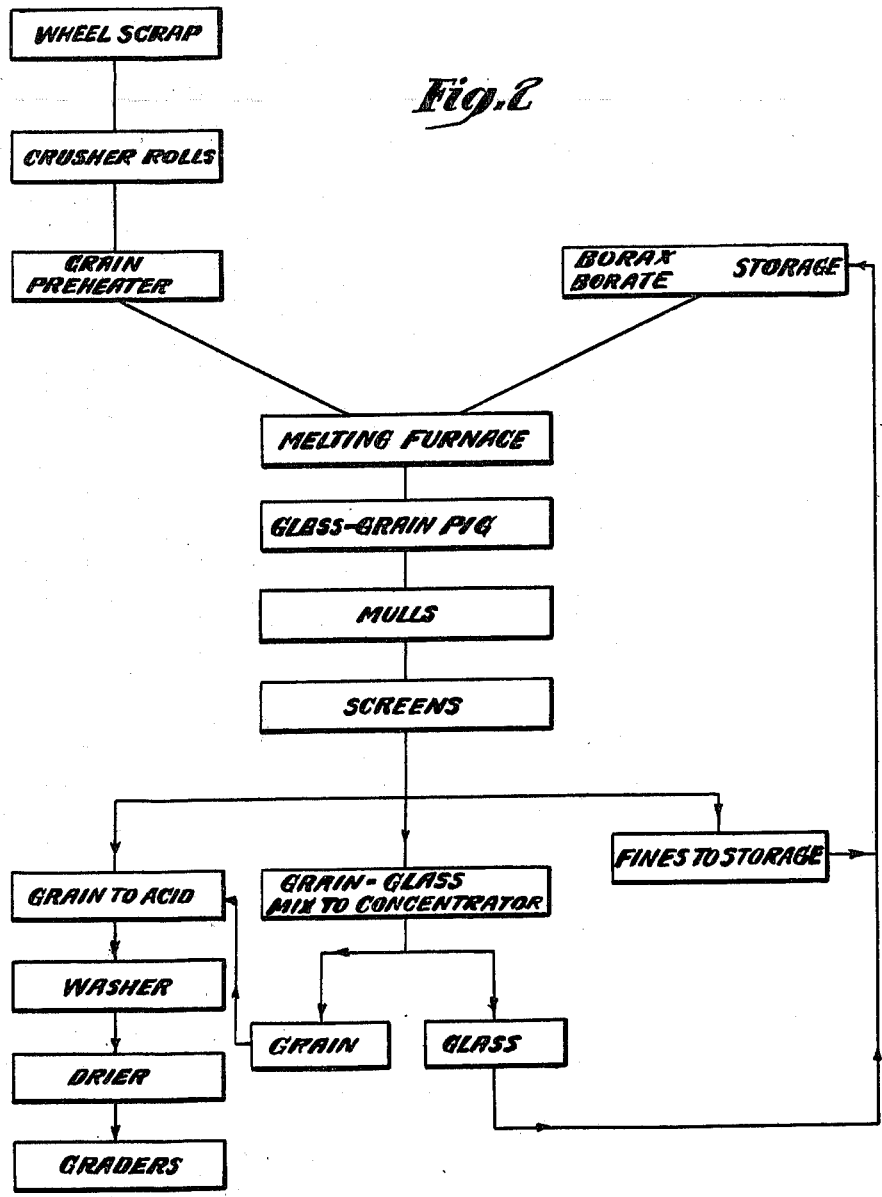

1,750,174

UNITED STATES PATENT OFFICE

EARL LEESON HAUMAN, OF HAMBURG, NEW YORK, ASSIGNOR TO THE EXOLON COMPANY, OF BLASDELL, NEW YORK, A CORPORATION OF MASSACHUSETTS

RECOVERY OF BONDED MATERIALS

Application filed June 29, 1926. Serial No. 119,334.

This invention relates to the reclamation of certain materials, notably those which are in a divided or extended state in a bonded mass. In many cases such materials are formed into manufactured products which after a period of use lose their original efficiency and are scrapped, in many instances forming absolute waste even though they contain material of high quality and value.

My present invention contemplates the reclamation of such materials and for the purposes of illustration I have chosen the abrasive field as one of convenient illustration although it might be said in connection therewith that certain refractory materials are so intimately associated that much of my discussion may be taken as applied to that field also.

Without intending that my discussion shall be taken as limiting in any way, I will proceed to disclose my invention as applied to the reclamation of bonded abrasives which have been manufactured into wheels, discs or other forms. After a comparatively short life of usefulness such articles become ill adapted by loss of size or form to the work for which they were designed and usually have to be discarded.

Obviously, the materials remaining in such articles are valuable materials and have their original usefulness and efficiency and are usually capable of being employed again for the same or similar purposes if they can be disassociated from the bond used in forming them into the original article.

This has been long recognized and various attempts have been made to separate the bond and the abrasive crystals, but so far as I know this has not been found possible under ordinary conditions and the only attempts which approached success were based on caustic digestion under certain war conditions which made the high cost and expensive apparatus at all justified.

My invention contemplates the removal of the bond by the use of a fused reagent to dissolve the undesirable constituents of the scrap material and in so doing methodically so as to make the process one capable of practice under ordinary plant conditions which will give a reasonable manufacturing efficiency.

In order to make my invention clear, I will proceed to discuss a process which I have found commercially satisfactory and economically justified. In order to fully disclose the various features of my invention I have provided a diagrammatic lay out as an aid to the understanding of my invention, this diagram constituting the accompanying sheet of drawings, in which:

Fig. 1 illustrates a preferred method of procedure, and

Fig. 2 a modification of the same.

Referring first to the process involved, I have found it possible to reduce ordinary bonds for such articles as abrasive wheels and refractory lining units by a fused reagent such as borax or a borate. The difficulty in the use of a fused reagent lies in its liability to attack the very material to be salvaged. In the case of an abrasive, there is particular danger of spoiling the efficiency of the abrasive grains to be salvaged by the attack of the reagent.

In this connection I have found it possible to introduce as an element of control, the matter of temperature. Certain fusible reagents as will be hereinafter described react differently at different temperatures. For example, borax which I mention herein specifically as a preferred reagent has a negligible reaction on silicon carbide, and aluminum oxide in crystal form and in usual sizes, say above 80 mesh below temperatures around 1600° F. Borax has, however, a high affinity for the usual bond which is usually of a clay origin and high in aluminum silicate. This situation is characteristic and highly illustrative.

In accordance with my invention it is possible by the use of such a solvent as fused borax or a fused borate to reduce the bond from its resistant form to an easily frangible glass which can be broken up to free the crystals to be reclaimed. Such thin particles or scales of glass as may remain on the crystals can be readily dissolved so that substantially the whole of the original crystalline content can be reclaimed in substantially perfect crystalline form and with substantially its original abrasive qualities.

As illustrative of my invention I will now proceed to describe with more particularity my process in its various steps and in addition to point out an improved method of putting the product through the plant to secure a high economy and efficiency in production.

Following the diagram of Fig. 1, I take the bonded abrasive, as for example, the wheel scrap, refractory lining or other material and crush it, preferably through rolls. At this point a great manufacturing advantage is attained by ascertaining the average size of the main crystalline body of the material and crushing the scrap to that size.

In some instances particles of the bond are freed from the grain by the crushing action of the rolls and can be immediately removed by any usual concentration methods. This makes it necessary to subject to fusion treatment only that portion of the charge which is characterized by an unbroken union of bond and grain. In such fusion treatment I then preheat the grains so attained preparatory to their union with the fused solvent in the insulated digester suggested in Fig. 1. As I have originally pointed out, such a reagent as borax or a borate has little or no effect on the crystals up to about 1600° F. I therefore take approximately 1600° F. as my maximum temperature reaction. I have found that by preheating the scrap grain to about 1200° F. and by fusing my reagent, I obtain a temperature which with the heat of combined reaction will maintain in an insulated digester a temperature somewhat below 1600° F. which is ample to produce a highly efficient solution of the bond so that as the material cools down in the digester the abrasive grains are found embedded in a soluble glass from which they are easily freed. I point out this preheating step as one of great economy and importance practically, although I will later describe an alternative step or steps which may be successfully used.

I now mull the glass-grain pig from the digester. The material from the mulls may contain as high as 75% to 80% of free grain or crystal abrasive, together with a considerable amount of fine glass and a slight amount of glass in coarser particles. By the term mull or mulling is meant any suitable mechanical action, the result of which is to reduce or break down the grains and this term was so used in the claims.

Here again, I would point out an important and efficient factor in practical procedure. Any considerable amount of coarser glass particles I have found to indicate the presence of an excess of borax and I am therefore able to regulate this phase in my method by reducing the supply of borax drawn from the melting furnace and added to the preheated scrap grain. This provides not only efficient regulation, but a maximum economy in operation.

The material from the mulls is screened or separated in any well known manner. The abrasive grain is fed to an acid bath as indicated in the diagram of Fig. 1, after which it is washed and dried and graded. The grain-glass mixture is separated by any means as by a concentrator. The difference in specific gravity makes this an easy operation. The abrasive grains from this separation are treated with acid, washed, dried and graded while the glass particles are passed along to the storage supply for the melting furnace where it has added to it sufficient borax to restore its effectiveness as a solvent. The amount to be added at this point is determinable as heretofore mentioned by the presence of the free glass under separation. The fine glass from the screens can be remelted for solvent.

It will therefore be seen that in practicing my process I have a method in part continuous and correlated so as to gain the highest efficiency and economy. In the diagram of the accompanying drawings I have indicated the materials and successive steps as follows.

In Fig. 1 which is diagrammatical of a preferred procedure in accordance with my process, I have indicated a supply or storage of material to be covered indicated by the legend "Wheel scrap". Below this I have indicated as a stage or station "Crushing rolls" and below this as the next station a "Grain preheater". In practice this preheater may be cut in on any available source of heat, as for example, a stack or flue, so that otherwise waste heat may be utilized for bringing the crushed scrap up to the desired heat preliminary to the addition of the solvent reagent.

As heretofore pointed out the degree of this preheating of the scrap may be made a valuable factor because by giving it a preliminary temperature in relation to the fused solvent, the maximum temperature resulting from the added heat of reaction can be kept below the point of attack on the grain crystals. In practice I find that the preheating of the grain to about 1200° F. is usually about right, although for different materials this may vary as it has relation not only to the character of the scrap, the nature and amount of the bond, but also to the nature and amount of the reagent and the temperature of the reagent.

These factors can be determined readily by watching the temperature of the insulated digester. If the temperature tends to rise too high the preheating of the scrap can be regulated if the other factors are to remain constant or if the temperature is too low the preheating can be increased if the other factors are constant. If the amount of the solvent is varied adjustments in temperature either way can be effected and will be observable by the temperature in the digester and by the character and amount of the glass observed at the mulls as heretofore explained.

Referring to the diagram I have indicated at the upper right of the figure a source or reagent which in practice may be any convenient "storage" of size and location related to the capacity of the plant. This "storage" may be considered in most references merely as a single source of the solvent material, but in fact it comprises two independent supplies. For the initial starting of the process I use the borax referred to as an illustrative reagent herein. The borax is fused and introduced with the preheated grain scrap into an insulated digester as indicated in the diagram.

After the process has been started as will be explained later, the residue glass which in the present instance is a borate is returned to "storage" as indicated by the arrow lines, fused and introduced into the insulated digester with the scrap as the reagent or solvent for the bond. In order to maintain the efficiency and standardize the rates of reaction, I add small amounts of fresh borax, which, of course, is fused to the charge going into the digester.

As heretofore indicated the heat of reaction is sufficient in large part to maintain the digestive action if conserved. This is a feature of considerable economy and for this reason I provide the insulated digester and the preliminary heating of the materials. It is not only a matter of economy but by observation and regulation of the preliminary temperatures and proportions of material the digester process or dissolving of the bond and formation of the borate glass will be held within the limit of safety which in the case of borax is about 1600° F.

When properly proportioned and temperatured, the materials react in the digester ordinarily so that when the temperature in the digester begins to drop the completion of the step is indicated. The glass-grain pig is withdrawn and passed to mulls which crumble it.

When properly practiced in preliminary steps my process usually gives 75% to 80% of free grains, that is, grain substantially free from the glass and only requiring a comparatively slight washing to restore them to their original condition. The glass-grain mixtures from the mulls is screened and the free grains immediately passed to the acid bath.

The glass-grain mix, that is, the glass and grain of less than the normal maximum size of the abrasive used, is separated in any convenient way, as for example, by a concentrator type of machine. This can be done very conveniently on account of the difference in specific gravity between the grains and the glass. The grain recovered at this station is passed to the acid bath. From the acid bath the grains go to the "washer" and are then dried and graded as indicated in the diagram. The glass from the concentrator is, as indicated in the diagram, returned to storage and used again as the fused solvent for subsequent charges of scrap.

A considerable amount of the glass from the glass-grain pig is reduced to very fine particles which readily separate in screening and these are returned with the glass from the concentrator to storage and join the cycle in which they operate.

While I have preference for the preheating and digestive method above indicated as most efficient, it is possible to practice my process after a different method. As indicated in Fig. 2, which generally corresponds in diagrammatic form to that of Fig. 1, the crushed scrap either directly from the rolls or preferably from the preheater, meets the solvent, which may or may not be preheated in a "melting furnace" where it is raised to the desired temperature and maintained at that temperature until the reaction is completed. This, of course, in most instances involves the expense of heat and a greater degree of vigilance in watching the temperatures and in determining the completion of reaction. The glass-grain pig from such furnace may then be treated in the same manner as indicated in the method of Fig. 1.

Various modifications in other portions of the method may be introduced or substituted and various reagents employed. In fact, these reagents may be varied and instances should be varied with different scraps involving different bonds and different materials to be covered. In the case of aluminum oxide I call attention to the fact that the crystallized form is more inert than the amorphous form which is readily dissolved. The softening point of the glass from the frit or cold mass depends on the amount of silica and alumina present and the more of these materials the higher the softening point. Most of the bonds commercially will be found to be aluminum silicate which in the illustrative form of my process discussed forms the alumina silica borate.

As to the grains in the abrasive field, these usually are silicon carbide or aluminum oxide. In the case of aluminum oxide I preferably introduce a small amount of soda ash with the reagent as it increases the solubility of the glass without attacking the aluminum compound.

As an instance of actual procedure I crush the abrasive or refractory article to mesh size, depending on the size of the grain or grain as it exists in the bond. For example, coarse grain wheel of six mesh material I reduce to a six mesh grain or finer. A medium grain wheel of bonded 14 or 16 mesh material is reduced to grain of about that mesh or finer. In any case, extremely fine size products in the crushing are preferably removed from the process as being too high in vitrified constituents to be dealt with economically.

As another factor in reducing the amount of solvent necessary to produce satisfactory operation, I find it possible in some instances to mix a finer grain material with the larger sizes. This reduces the voids between the larger grains so that in the pig in the digester there is less glass to be eliminated.

The proportion of borax and grain is provided so that resulting frit will have a matrix of minimum cross section or bulk at the same time maintaining a sufficient quantity to accomplish the desired solution of the bonded portion of the mixture. A typical batch mixture is as follows: Vitrified bond grain 12 parts by weight; borax or its equivalent in borate or combinations of the borax and borate to equal 8 parts of borax by weight. I have introduced to advantage sodium carbonate to be used in three-fourths part by weight where the process does not involve silicon carbide. This gives a more soluble glass. One-half part by weight of litharge may also be employed to advantage. The lead oxides give a less viscous melt which facilitates operation.

The borax or borate is preferably fused in a refractory crucible or a refractory lined drum. I prefer to use as a refractory a silicon carbide as it is more inert in contact with the borax melt. Heat resisting metals may, however, be used. I find it preferable to add the fused borax or borate to the heated crushed material to be reclaimed, and find in most cases that a temperature of 1200° F. is satisfactory for the latter. This gives the desired temperatures in most instances in the digester in which a pyrometric temperature control is effective to keep below the maximum desirable temperature which I find to be 1650° F. The reaction usually continues quietly for about twenty to thirty minutes.

The amount of glass adhering to the grain is small, but not over 3% by weight according to my observations. The mixture of glass and grain from the mulls is preferably split into various grades according to grain sizes. These grades or mixtures of grain and glass particles vary from practically no glass with coarse grains to the reverse order of finest size. Standard concentration tables used for grading mineral ores are used by me in effecting this separation although other forms of separation may be used.

I will not attempt to enumerate the great number of recoverable bonded materials to which my process may be applied, but most abrasive and refractory materials such as silicon and aluminum oxide, sintered magnesia, etc., may be recovered without other variation of my process than that which would be readily suggested by it to those skilled in the art. In some cases fused caustics may be employed as a solute for the purpose of dissolving the less inert constituents from the more inert.

All such variants and modifications in process and method may be resorted to without departing from the spirit of my invention if within the limits of the appended claims.

What I therefore claim and desire to secure by Letters Patent is:

1. In a process of reclaiming dispersed material from a vitrified bonded mass consisting in comminuting the mass, introducing a molten solvent, maintaining a predetermined temperature above the fusion point of the solvent, mulling the resultant and separating.

2. In a process of reclaiming crystalline material from a bonded mass consisting in comminuting the mass, introducing a fusible solvent relatively inactive on the crystals below certain temperatures and in maintaining a predetermined temperature above the fusion point of the solvent and below the temperature of material attack on the crystals, and in mulling the resultant and separating.

3. In a process of reclaiming a crystalline material from a bonded mass consisting in comminuting the mass, introducing a fused borate to form a soluble glass, and in mulling the resultant and separating.

4. In the process of reclaiming ceramically bonded crystals or the like, consisting in dissolving the bond by a fused solvent having an affinity for the bond at high temperature, and in holding the temperature of the reacting mass approximately below the point of material attack on the crystal.

5. In the process of reclaiming a bonded crystalline material, consisting in dissolving the bond by fused borax while holding the temperature of the reacting mass approximately below the point of material attack on the material.

6. In the recovery of dispersed crystalline material from bonded articles consisting in comminuting the bonded mass to substantially the size of the crystals, in adding similarly prepared material of smaller size, in dissolving the bond by a fused solvent, and in freeing the grains from the resultant compound of solvent and bond.

7. In the recovery of crystalline material from bonded articles consisting in comminuting the bonded mass to substantially the size of the crystals, in dissolving the bond by a fused solvent, and in freeing the grains from the resultant compound of solvent and bond.

8. In a process of reclaiming bonded material by a fused solvent, those steps consisting in reintroducing the resultant compound of solvent and bond with fresh solvent to maintain a predetermined solvent efficiency.

9. In a process of reclaiming bonded crystals by fused borate, those steps consisting in reintroducing the resultant borate with fresh borax to maintain a predetermined solvent efficiency.

10. In a process of reclaiming a bonded material, that step which consists in reducing the bond to a relatively soluble glass by a fused solvent.

11. In a process of reclaiming a vitrified bonded material, those steps which consist in reducing the bond to a relatively soluble friable material by a fused solvent, in mulling and separating, and in washing the material by a solvent to produce purified grains.

12. In a process of reclaiming a crystal material from a vitrified bond, that step which consists in increasing the frangibility of the bond by chemical replacement to produce purified grains.

13. The process of reclaiming material from a vitrified bond, that step which consists in increasing the solubility and frangibility of the bond by chemical replacement, in crushing the bond to free the frangible particles in part and in dissolving the adherent particles from the crystals to produce purified grains.

14. In a process of reclaiming a material from its bond, that step which consists in rendering the bond soluble in a reactive solution by chemical substitution in the bond constituents.

In testimony whereof I affix my signature.

EARL LEESON HAUMAN.